United States Patent
Sklovsky et al.

(10) Patent No.: US 8,229,354 B2
(45) Date of Patent: *Jul. 24, 2012

(54) METHOD AND APPARATUS FOR AUTOMATIC APPLICATION SELECTION IN AN ELECTRONIC DEVICE USING MULTIPLE DISCOVERY MANAGERS

(75) Inventors: Vladimir Sklovsky, Vernon Hills, IL (US); Thomas Buhot, Toulouse (FR)

(73) Assignee: Motorola Mobility, Inc., Libertyville, IL (US)

( * ) Notice: Subject to any disclaimer, the term of this patent is extended or adjusted under 35 U.S.C. 154(b) by 471 days.

This patent is subject to a terminal disclaimer.

(21) Appl. No.: 12/398,105

(22) Filed: Mar. 4, 2009

(65) Prior Publication Data

US 2009/0247078 A1    Oct. 1, 2009

(30) Foreign Application Priority Data

Mar. 27, 2008   (EP) .................................. 08305073

(51) Int. Cl.
*H03B 5/00* (2006.01)
(52) U.S. Cl. ...................................... 455/41.1; 455/41.2
(58) Field of Classification Search .................. None
See application file for complete search history.

(56) References Cited

U.S. PATENT DOCUMENTS

| | | | |
|---|---|---|---|
| 6,098,890 | A | 8/2000 | Kreft et al. |
| 6,852,031 | B1 | 2/2005 | Rowe |
| 7,549,590 | B2 | 6/2009 | Matsushita et al. |
| 7,797,537 | B2 * | 9/2010 | Kurita et al. ................. 713/169 |
| 2006/0109931 | A1 | 5/2006 | Asai et al. |
| 2006/0290496 | A1 | 12/2006 | Peeters |
| 2007/0131759 | A1 | 6/2007 | Cox et al. |
| 2007/0263596 | A1 | 11/2007 | Charrat |

(Continued)

FOREIGN PATENT DOCUMENTS

EP   1798867 A2   6/2007

(Continued)

OTHER PUBLICATIONS

PCT Search Report, "Search Report and Written Opinion, Form PCT/ISA/220", Corresponding PCT Application No. PCT/US2009/036448, Filed Mar. 9, 2009.
PCT Search Report, "Search Report and Written Opinion, Form PCT/ISA/220", Filed Mar. 29, 2009, Mailed Nov. 4, 2009.
"Notice of Allowance", U.S. Appl. No. 12/398,057, filed Mar. 4, 2009, mailed Aug. 18, 2011.

*Primary Examiner* — An Luu

(57) ABSTRACT

In a portable electronic device (100) having a plurality of near field communication applications stored within a plurality of execution environments, automatic selection of one of the near field communication applications is performed by a protocol discovery manager (319) and an application discovery manager (316). The application discovery manager (316) is disposed within a default execution environment. The protocol discovery manager (319), which operates in a near field communication circuit controller (301), performs application discovery at the mode switch level (321), the collision detection level (322), and the protocol level (323). The application discovery manager (316) performs application discovery at the application level. Where the protocol discovery manager (319) selects an application, it can configure a routing switch (219) to route data to the appropriate execution environment and launches the selected application, where only protocol level of identification is required. Where other levels are required, the protocol discovery manager (319) selects and routes data to the default execution environment containing application discovery manager (316). The application discovery manager (316), upon selecting an application, can either launch the application or forward a message to the appropriate execution environment for further execution as required by the selected application.

19 Claims, 6 Drawing Sheets

U.S. PATENT DOCUMENTS

| | | |
|---|---|---|
| 2008/0011833 A1 | 1/2008 | Saarisalo |
| 2008/0042807 A1 | 2/2008 | Park et al. |
| 2008/0207128 A1 | 8/2008 | Mikko |
| 2009/0191812 A1* | 7/2009 | Teruyama et al. ............ 455/41.1 |
| 2009/0247077 A1* | 10/2009 | Sklovsky et al. ............ 455/41.1 |
| 2009/0247078 A1 | 10/2009 | Sklovsky et al. |
| 2010/0222000 A1* | 9/2010 | Sauer et al. .................. 455/41.2 |

FOREIGN PATENT DOCUMENTS

| | | |
|---|---|---|
| WO | WO-02/43019 | 5/2002 |
| WO | WO-2004/003801 | 1/2004 |
| WO | WO-2006/111782 | 10/2006 |

* cited by examiner

METHOD AND APPARATUS FOR AUTOMATIC APPLICATION SELECTION IN AN ELECTRONIC DEVICE USING MULTIPLE DISCOVERY MANAGERS

CROSS REFERENCE TO PRIOR APPLICATIONS

This application claims priority and benefit under 35 U.S.C. §119 from European Patent Office Application No. EP 08305073, filed Mar. 27, 2008, having the same title, which is incorporated by reference for all purposes.

BACKGROUND

1. Technical Field

This invention relates generally to electronic devices having near field communication circuitry and near field communication applications, and more particularly to a device having an application discovery manager and a protocol manager capable of selecting one near field communication applications at different protocol stack levels from many near field communication applications.

2. Background Art

Mobile devices today are becoming increasingly complex. By way of example, a mobile telephone was used—no too long ago—only for making telephone calls. Today, however, some mobile telephones are equipped with near field communication technology, such as radio frequency identification (RFID) circuits, infrared communication circuits, and so forth. This near field communication technology can obtain information from other near field communication devices, deliver information to near field communication terminals, and even engage in financial transactions.

By way of example, when carrying a device equipped with near field communication technology, a person can use the device in place of traditional cards, currency, or tickets. For instance, "virtual cards" can be loaded into a "virtual wallet" within the device. A virtual wallet is simply an electronic application on the device that includes a virtual card software application. The virtual card software application hosts various virtual cards, which may include a credit card, a debit card, a public transportation pass, tickets to a play, and so forth. The virtual card application manages the virtual cards and permits user selection of the cards as well.

When a user approaches a near field communication terminal, such as a payment terminal at a restaurant or a ticket gate at the subway, the user manually selects a virtual card from the virtual wallet and waves the mobile device across the near field communication terminal. The mobile device then transmits the information wirelessly to the near field communication terminal via the near field communication circuitry. As such, the mobile device takes the place of a physical wallet.

In addition to being able to use virtual cards, portable electronic devices having near field communication technology are also capable of operating as near-field readers as well. A reader application within the electronic device is capable of reading external objects like RFID tags or smart posters. (A smart poster is a poster that includes a near-field communication tag capable of being read by the wireless near-field transceiver. A smart poster for a movie may include a near-field communication tag having information about show times, movie merchandise, and the like. When a user passes an electronic device having a wireless near-field communication circuit within a predetermined distance of such a poster, the device may read the information and present corresponding information on the display.)

The problem with all of these near field communication applications, including the many virtual cards, reader applications, and other applications, is that it can be cumbersome and difficult for the user to select the proper application for a particular near field communication device. For instance, a commuter carrying a briefcase and computer bag may not want to sift through a stack of application icons and menus in a mobile telephone to access a virtual subway card to be able to get on the subway. That same commuter would again not want to stumble through menus and icons to access a virtual identification card when he arrived at work. To further compound the problem, various near field communication terminals can use different technologies. This requires the user to alert the mobile device as to what type of technology a corresponding near field communication uses.

In short, the advent of near field communication technology in mobile devices offers users the ability to wirelessly communicate with a wide variety of near field communication technologies using a wide variety of near field communication applications. However, navigation among applications is time consuming and cumbersome. There is thus a need for a method and apparatus to facilitate automatic selection of a near field communication application without requiring the user to manually sift through lists of icons or menus.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
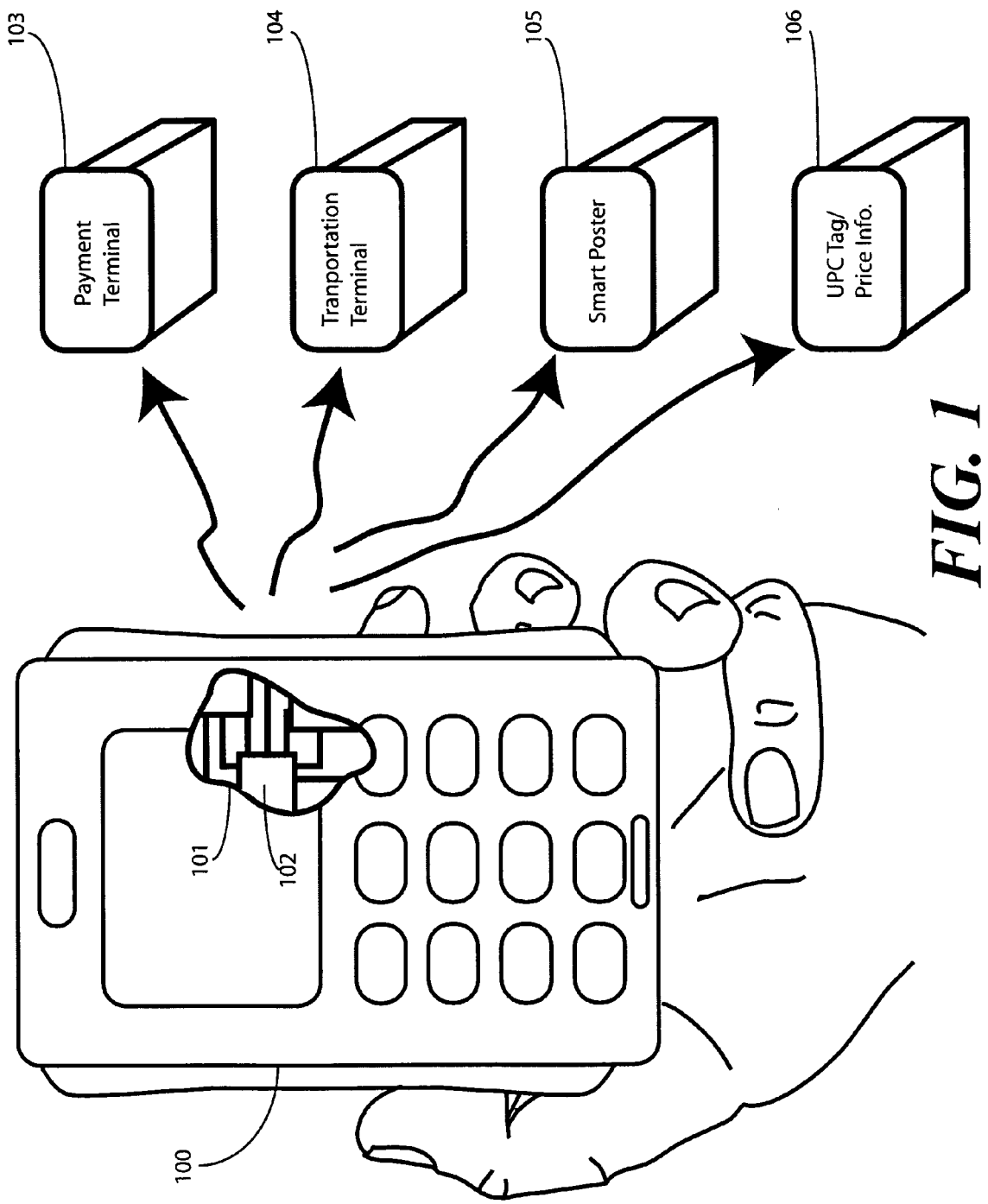
FIG. 1 illustrates a portable electronic device in accordance with embodiments of the invention communicating with various external near field communication devices.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to an automatic selection of a near field communication application from a group of near field communication applications in an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of the automatic selection of a near field communication application as described herein. The non-processor circuits may include, but are not limited to, a radio receiver, a radio transmitter, signal drivers, clock circuits, power source circuits, and user input devices. As such, these functions may be interpreted as steps of a method to perform the automatic selection of the near field communication application. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a method for automatically selecting a near field communication application in a portable electronic device. In one embodiment, the portable electronic device has a plurality of near field communication applications stored in a plurality of execution environments. These execution environments can include embedded memory devices, removable devices such as Subscriber Identification Module (SIM) cards, Universal Integrated Circuit Cards (UICCs), microSD cards, and so forth. Where these execution environments are confirmed to be trusted execution environments, they are referred to as "secure elements."

The methods and apparatuses taught here for selecting one of the near field communication applications from the various applications in the various execution environments provide a system that accommodates the timing requirements associated with near field communication circuits. For instance, many standards for contactless, near field communication protocols set forth aggressive timing limitations for data communication. To accommodate these requirements, one embodiment of the invention includes a messaging module configured to communicate between the various execution environments.

By way of example, if a first application is selected, and that application turns out reside in another execution environment, the messaging module will forward information about the selection to another execution environment, thereby eliminating overhead in protocol selection and other identification tasks. Further, the presence of the messaging module eliminates the necessity of resetting or restarting a selection process or transaction process when transitioning from a first execution environment to another execution environment. The messaging module also offers the ability to forward certain commands from one execution environment to another one. This eliminates the need to restart a particular transaction with a new session identifier when transitioning from one execution environment to another one.

In one embodiment, an application discovery manager is located within a default execution environment. The application discovery manger, as will be described below, is responsible for selecting the near field communication application to be used at an application level of the protocol stack. While the application discovery manager could be located in the near field communication circuit, in one embodiment it resides in a default execution environment. When an external near field communication device comes within communication proximity of the portable electronic device, and the application selection is to be made at the application level, the application discovery manager in the default execution environment is enabled. The near field communication circuit then transmits file control information associated with one or more enabled near field communication applications through the near field communication controller. The file control information can include a list of application identifiers associated with the enabled near field communication applications.

The external near field communication device then transmits a command identifying a selected application identifier from the list of application identifiers to the near field communication circuit. The application discovery manager then determines which near field communication application should be selected from the selected application identifier. The application discovery manager, in one embodiment, does this by accessing a registry table stored within the default execution environment.

Once the near field communication application has been selected, the application discovery manager determines in which execution environment it resides. Where the selected near field communication application resides in the default execution environment, the application discovery manager can simply actuate the application. Where, however, the selected near field communication application resides in another execution environment, the application discovery manager works to actuate that execution environment by transmitting a forwarding message.

In one embodiment, the application discovery manager sends an application forwarding message to a selected execution environment corresponding to the selected near field communication application. The application discovery manager selects the execution environment because it corresponds to the selected application identifier.

The forwarding message includes information that permits the application manager in the selected execution environment to "hit the ground running" in that it need not restart the discovery process. For example, the forwarding message can include a forwarding level of detection, wherein the forwarding level of detection is selected from the group consisting of a protocol level, an anticollision level, a transfer level, and an application level. The forwarding message can further include an indicator of a status of a layer detection sequence, a most recently received command response, and a near field communication device identifier. In addition, the forwarding message can be used to forward the transaction status and other control information (session identification number for instance) to keep the near field communication transaction uninterrupted.

In addition to sending the forwarding message, the application discovery manger can additionally control a routing switch to ensure that data is routed between the near field communication circuit and the selected execution environment. This and other methods, as well as hardware structures associated with embodiments of the invention, will be explained in more detail with reference to the figures below.

Embodiments of the invention also include a protocol discovery manager running in a near field communication circuit controller. The protocol discovery manager has selection capability as well, although it's selection-making algorithms work at the mode switch, collision detection, and protocol levels of the stack. Where selection is made at these levels, the protocol discovery manager makes the selection, enables the proper execution environment, and configures the switch for data routing.

Turning now to FIG. 1, illustrated therein is one embodiment of a portable electronic device 100 having near field communication capability in accordance with embodiments of the invention. Specifically, the portable electronic device 100 includes a near field communication circuit 101 having a near field communication circuit controller 102 coupled thereto. The near field communication circuit controller 102 emulates a single near field communication interface such that the portable electronic device 100 can wirelessly communication with a variety of near field communication devices employing various near field communication technologies and protocols. Exemplary near field communication devices include a payment terminal 103, a transportation ticket terminal 104, a smart poster 105, and a RFID tag 106.

The near-field communication circuit 101 can include as an antenna a communication coil that is configured for near-field communication at a particular communication frequency. The term "near-field" as used herein refers generally to a distance of less than about a meter or so. The communication coil communicates by way of a magnetic field emanating from the communication coil when a current is applied to the coil. A communication oscillator applies a current waveform to the coil. The near field communication circuit controller may further modulate the resulting current to transmit and receive data.

The near field communication circuit controller 102 can be a microprocessor running embedded code, a transceiver integrated circuit, an application specific integrated circuit, an RFID device, or equivalent device. The near field communication circuit controller 102 works to facilitate data communication with other near field communication devices by transmitting data in radio frequency form. One may refer to the publicly available standard at www.ecma-international.org/publications/files/ECMA-ST/Ecma-340.pdf, which is incorporated herein by reference, for more details. Where the near-field communication is RFID communication, for example, this frequency may be about 13.56 MHz as is directed by recognized RFID standards.

Near field communication applications capable of running within the portable electronic device 100 are stored within multiple execution environments. Each execution environment includes an application manager capable of executing the applications disposed therein. One execution environment is selected as the "default" execution environment and includes the application discovery manager.

Figure 2:
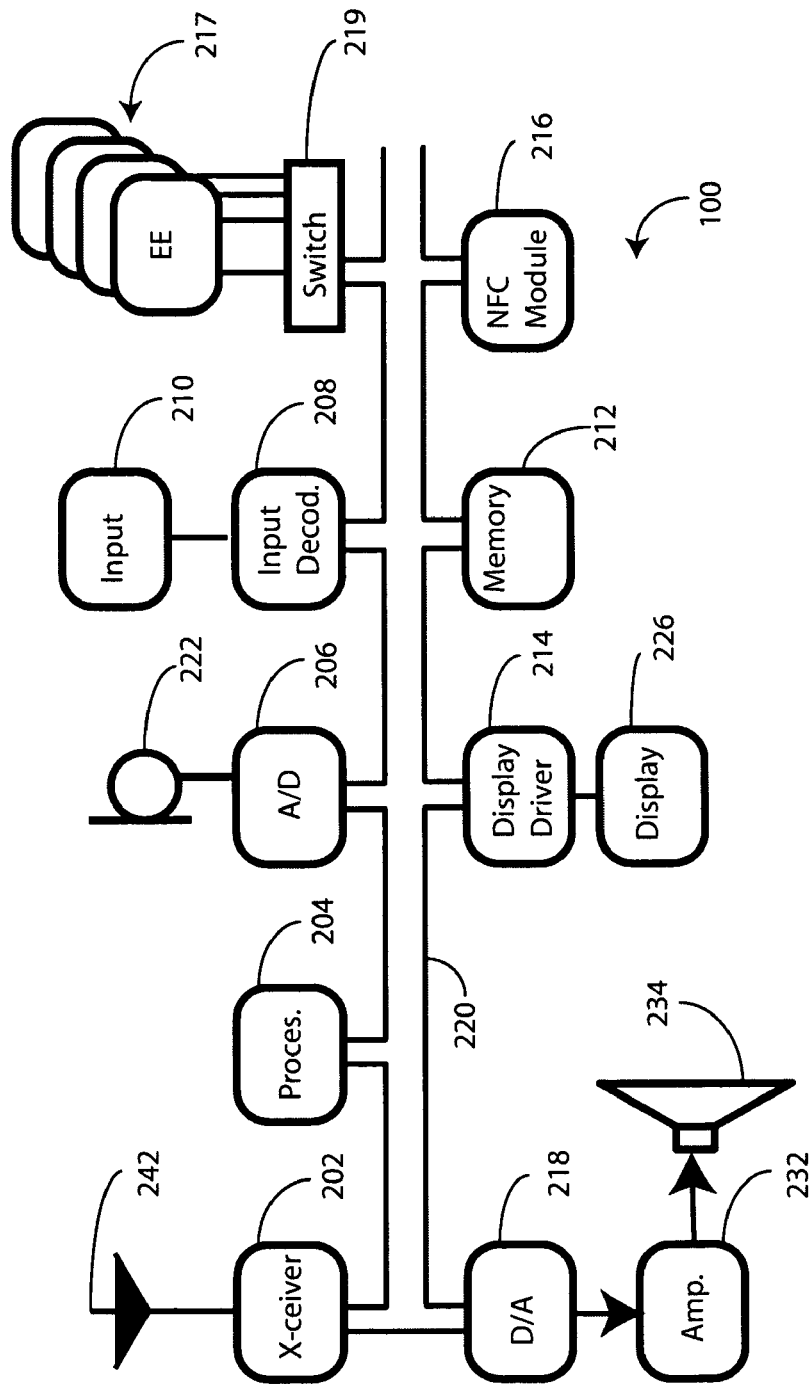
FIG. 2 illustrates a block diagram of a portable electronic device in accordance with embodiments of the invention.

Turning now to FIG. 2, illustrated therein is an exemplary schematic block diagram of the near field communication elements of the portable electronic device (100) of FIG. 1. For discussion purposes the portable electronic device 100 described herein will be that of a mobile telephone, as they are so prevalent. While a mobile telephone will be used herein as an illustrative embodiment for discussion purposes, it will be clear to those of ordinary skill in the art having the benefit of this disclosure that the invention is not so limited. The application discovery manager, the protocol discovery manager, and associated methods and apparatuses described herein may also be implemented in other portable electronic devices, including personal digital assistants, pagers, portable computers, and so forth.

In one embodiment, the portable electronic device 100 includes a transceiver 202 for communication with wide area networks and a processor 204 for executing the operations of the portable electronic device 100. Other standard components can be included, such as an analog to digital converter (A/D) 206, a input decoder 208, a memory 212, a display driver 214, and a digital to analog converter (D/A) 218. Each component is coupled together through a digital signal bus 220.

The transceiver module 202 is coupled to an antenna 242. Where the portable electronic device 100 is a communication device such as a mobile telephone, carrier signals that are modulated by data, e.g., digitally encoded signals for driving the MFT or digitally encoded voice audio, pass between the antenna 242, and the transceiver 202.

The input device 210 is coupled to the input decoder 208. The input decoder 208 serves to identify depressed keys, for example, and provide information identifying each depressed key to the processor 204. The display driver 214 is coupled to a display 226.

The D/A 218 is coupled through an audio amplifier 232 to a speaker 234. The D/A 218 converts decoded digital audio to analog signals and drives the speaker 234. The audio amplifier 232 may comprise a plurality of amplifiers with each driving a separate speaker.

The memory 212 is also used to store programs that control aspects of the operation of the portable electronic device 100. The memory 212 is a form of computer readable medium.

The transceiver 202, the processor 204, the A/D 206, the input decoder 208, the memory 212, the display driver 214, the D/A 618, the near field communication circuit 216, the audio amplifier 232, and the digital signal bus 620 are embodied in the electrical circuit components and interconnections along a circuit board.

The near field communication circuit 216, which will be explained in more detail below, is configured to communicate wirelessly with external near field communication devices. Where appropriate, the portable electronic device 100 will include near field communication applications, such as virtual cards, a smart device reader, and so forth, that are suitable for use with the near field communication circuit 216. These near field communication applications are stored, in one embodiment, in one of several execution environments 217. One of these execution environments is designated as the "default" execution environment and includes the application discovery manager, which is responsible for selecting a near field communication application.

In addition to the application discovery manager disposed within the default execution environment, a second application selection device operates in the near field communication circuit controller of the near field communication circuit 216. This "dual" selection manager structure facilitates handling of time-sensitive discovery operations. In one embodiment, the application discovery manager is used for application selection at the application level, while the second application selection device is used for selection at the RF or protocol levels.

To illustrate this dual-mode selection system, consider that the selection process is generally performed in the levels of the protocol stack. Selections of time critical applications generally occur at the protocol levels mostly, such as the mode switch activity level and the collision detection level due to the RFID/NFC protocol standards requirements (as set forth in ISO14443 and ISO18092, which are each incorporated herein by reference). By way of example, with one near field communication technology, the response time occurring during the election process for the response command from a target cannot exceed 80-150 microseconds. For other near field communication applications, protocol commands such as those occurring at the collision detection level generally can have time delays no longer than 4-5 milliseconds.

Other upper levels of selection, which can be based on APDU or proprietary commands, have less stringent timing requirements. As such, the corresponding application selection process is less time sensitive. NFC or RFID applications running on the top of protocols, for instance, are less time sensitive in that the time delays can be measured by tens of milliseconds or more.

To accommodate the selection of applications, the near field communication circuit controller is tasked with protocol selection at the RF level. The application discovery manager running in the default execution environment is responsible for application selection at the application level. As such, the discovery process is "split" between these two modules.

Figure 3:
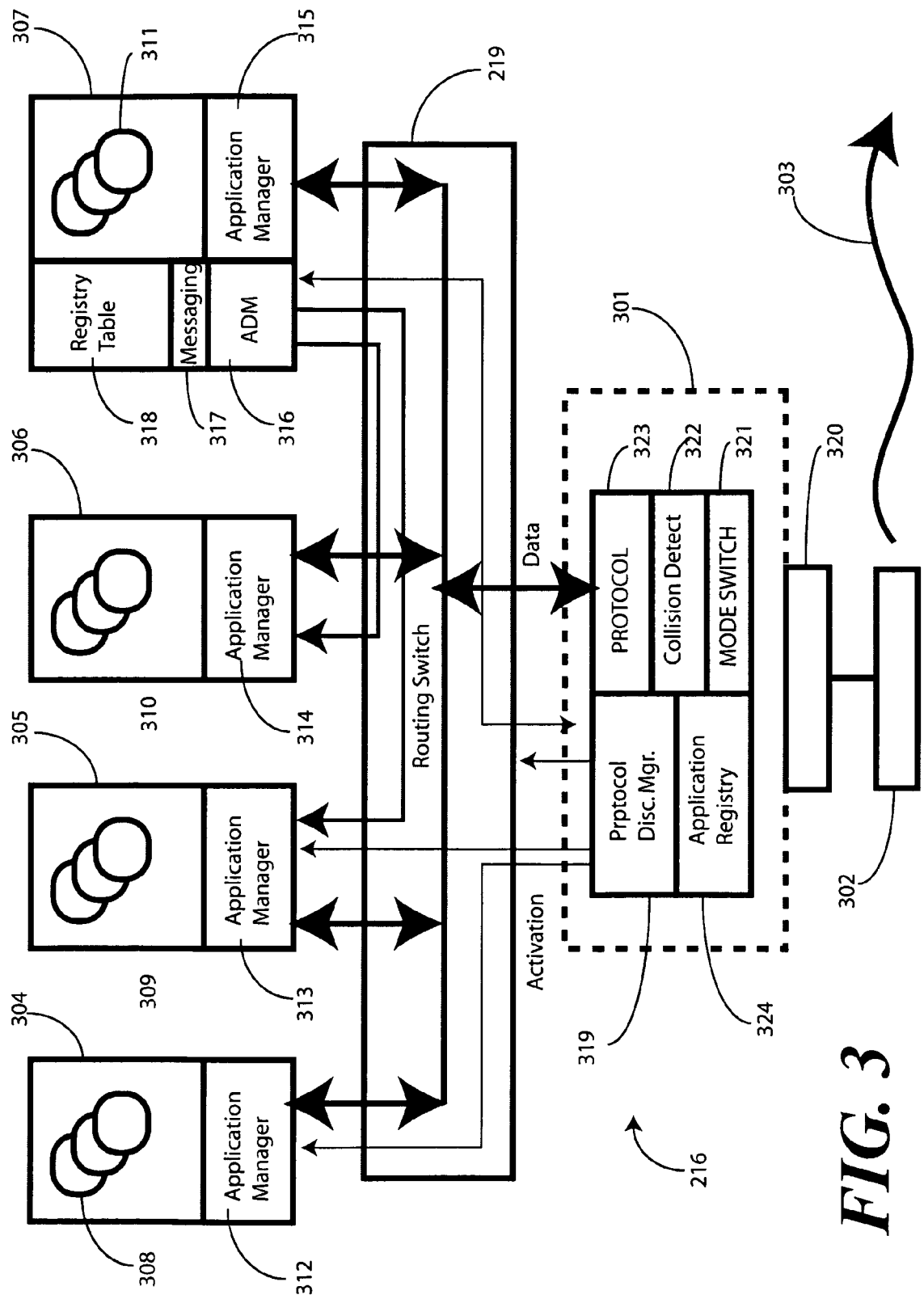
FIG. 3 illustrates a schematic block diagram of a near field communication circuit in accordance with embodiments of the invention.

Turning now to FIG. 3, illustrated therein is one embodiment of a near field communication circuit 216 and corresponding execution environments in accordance with the invention. A near field communication circuit controller 301, which may be a microprocessor, application specific integrated circuit, or other similar device, is configured to facilitate near field communication with external near field communication devices. The near field communication circuit controller 301 is coupled to a near field communication circuit antenna 302, which may be embodied in a coil disposed on a printed circuit board or other substrate. Communication signals 303 are transmitted and received through the near field communication circuit antenna 302. The near field communication circuit controller 301 communicates by way of a near field communication transceiver.

The near field communication circuit controller 301 facilitates data communication used in near field communication transactions with near field communication applications residing in the various execution environments 217. Memory devices, SIM cards, memory cards, embedded devices, and the like can each be an execution environment. Each execution environment can have multiple near field communication applications stored therein. Where the execution environment is trusted, it is referred to as a "secure element."

In FIG. 3, there are four execution environments 304,305, 306,307 shown. It will be obvious to those of ordinary skill in the art having the benefit of this disclosure that any number or type of execution environments can be used with embodiments of the present invention. The execution environments 304,305,306,307 have stored therein a plurality of near field communication applications 308,309,310,311, each being operable with the near field communication circuit controller 301. In the exemplary embodiment of FIG. 3, execution environment 304 includes one set of near field communication applications 308, while execution environment 305 has another set of near field communication applications 309. Execution environment 306 includes another set of near field communication applications 310, just as execution environment 307 has another set of near field communication applications 311. Execution environment 307 is designated as the default execution environment.

Each execution environment 304,305,306,307 also includes an application manager 312,313,314,315. The application manager 312,313,314,315 is configured to communicate with the near field communication applications stored within its execution environment, and to receive forwarding messages from the application discovery manager 316. Each application manager 312,313,314,315 further has the following functions: First, it is responsible for interpreting received commands, including user commands received from a user interface. Next, each application manager 312,313,314,315 is responsible for maintaining a corresponding registry of the various near field communication applications stored within its execution environment. The registry is a part of the application manager's database, and includes the identification parameters of each near field communication application in its execution environment. Examples of identification parameters include an application identification number, UID, PUPI, AID, SAK, ATQB_DAT, ATQA, and so forth. The registry can also include any required near field communication protocol parameters. It may also include application data or application family identifiers, for ISO 1444-3B type applications. Each application's identifiers may be stored as a complete table within the registry.

Note that as a user may intentionally select one of the near field communication applications in some situations, each application manager 312,313,314,315 is further configured to enable a selected near field communication application based on input received from the user interface directed towards its execution environment. Each application manager 312,313, 314,315 can launch such applications when selected by the user. Each application manager 312,313,314,315 may further disable its near field communication applications when directed to do so by the user.

One of the features of embodiments of the present invention, however, is that the user need not stumble through menus and commands to select a near field communication application, as this can be done by the application discovery manager 316 or the protocol discovery manager 319, depending upon the level of discovery. Where the protocol discovery manager 319 selects an application, it can configure the routing switch 219 to route data to the appropriate execution environment and can launch the selected application. This typically occurs where only protocol level of identification is required. Where other levels are required, the protocol discovery manager 319 selects and routes data to the default execution environment containing application discovery manager 316. The application discovery manager 316, upon selecting an application, can either launch the application or forward a message to the appropriate execution environment for further execution as required by the selected application.

The application discovery manager 316 resides in one of the execution environments 307. This execution environment 307 is denoted the default execution environment. The application discovery manager 316 is configured to select a near field communication application at the application level (as opposed to the near field technology level, collision detection level, or protocol level, which are handled by the protocol discovery manager 319).

The default execution environment includes not only the application discovery manager 316, but also a corresponding registry table 317. The registry table 317 includes a list of all near field communication applications that require an application level of selection. For instance, the registry table 317 can contain contains the application identifiers, including application identification numbers, element identification numbers corresponding to other execution environments, and so forth. The application discovery manager 316, via its messaging module 318, can use the element identification numbers to forward messages to other execution environments. In one embodiment, the registry table 317 includes at least a near field communication application identifier associated with each of the plurality of near field applications, and an element identifier that is associated with execution environments where applications reside that are not the default execution environment 307.

Through its message forwarding module 318, the application discovery manager 316 is capable of sending forwarding messages to execution environments other than the default execution environment 307. The message forwarding module 318 is configured to transmit application discovery messages from the default execution environment 307 to other execution environments 304,305,306. These messages are forwarded via the near field communication circuit controller 301. In one embodiment, the forwarding message includes an identifier of the receiving execution environment. This execution environment will be the environment in which the selected near field communication application resides. The forwarding message can also contain the status of application discovery, including what applications have been tried, at what protocol stack levels, and so forth.

To illustrate by example, in one embodiment, the application discovery manager 316 is configured to send be able to send messages from the default execution environment to another execution environment or secure element via the near field communication control circuit. One example of such a message would include a physical identifier of the other execution environment in which a particular application or applet resides. This physical identifier can be used to forward the execution of the transaction protocol to the other execution environment or secure element.

Once this message is routed, the application discovery manager 316 or the protocol discovery manager 319 can configure the switch to route data to the other execution environment or secure element based upon an element identifier received in the message and corresponding identifiers in the local registry table. The application discovery manager 316 or protocol discovery manager 319 can then initialize the other execution environment or secure element to run a particular applet or application according to a procedure described above, or in accordance with a preselected application priority as might be the case where there is a large latency time of initialization.

Working in tandem with the application discovery manager 316 is the protocol discovery manager 319, which in one embodiment is executable software running on the near field communication circuit controller 301. In addition to the protocol discovery manager 319, the near field communication circuit controller 301 also includes access to the near field communication transceiver 320 and an interface to the routing switch 219. The near field communication circuit controller 301 includes a capability to transfer data through the routing switch 219 to one of the execution environments 304,305,306,307.

The protocol discovery manager 319 is configured, in one embodiment, to identify a near field communication technology associated with an external near field communication device at a protocol level 323, a near field communication technology level 321, and at a collision detection level 322. Said differently, the protocol discovery manager 319 is configured to detect protocol level identifiers associated with the mode switch level 321, the collision detection level 322, and the protocol activation level 323 of the protocol stack. The protocol discovery manager 319 is further configured to activate near field communication applications that do not require the application level of discovery, including those based upon UID number, PUPI number, and so forth. The protocol discovery manager 319 is configured with routing capability to configure the routing switch 219 as well.

The protocol discovery manager 319 further includes an application registry 324. The application registry 324 is essentially a registry table like registry table 317, except that it includes those near field communication applications that do not require application level discovery.

Both the application discovery manager 316 and the protocol discovery manager 319 are configured with an ability to transmit a switch configuration message to the routing switch 219. The routing switch 219, which is operable with the near field communication circuit controller 301, is configured to selectively route data communication between the near field communication circuit controller 301 and the one or more execution environments 304,305,306,307. As such, either the application discovery manager 316 or the protocol discovery manager 319 is capable of transmitting a switch configuration message to the routing switch 219 to direct the routing switch 219 to route data communication between the near field communication circuit controller 301 and an execution environment associated with a selected near field communication application. Further, the protocol discovery manager 319 is capable of activating various secure elements, while the application discovery manager 316 can activate other secure elements.

The application discovery process applies to an application or applet, which is associated with a near field communication application or a family of applications. When discovery is performed by the application discovery manager 316, this application level discovery begins after the protocol levels so that application level commands can be exchanged between the near field communication circuit 216 and the external near field communication device.

To illustrate by example, consider a discovery performed by the application discovery manager 316 based on an application identifier, as set forth in ISO 7816 and the Global Platform Card Specification, ver. 2.1.1, March, 2008, from GlobalPlatform, Inc., which is incorporated herein by reference. The ISO7816 standard defines the default parameters for near field communication commands, such as the SELECT APDU command. However, in certain systems, the ISO7816 command can be overridden by commands or parameters set for the Global Platform specification. Further, the Global Platform specification sets forth additional parameters and options for commands useful in the application discovery process. Such a discovery may be used, for example, for payment transactions executed by near field communication. The application discovery manager 316, in one embodiment, identifies a selected near field communication application by receiving a terminal SELECT_APDU command from the external near field communication device.

This device further sends a SELECT_AID command with an application identification number. This application identification number corresponds to the external near field communication device. From this identifier, the application discovery manager can select applications that support that particular application identifier.

In another example, consider a discovery performed by the application discovery manager 316 based upon an application family identifier, as set forth in ISO 14443 B. Such a family identifier is transmitted in the command REQB/WUPB. This command alerts the recipient as to what type of application must be initialized to support the external near field communication device's transaction. Further, the format of the request provides the application family identifier, as well as CRC_B(AID) data. CRC_B(AID) is the result of calculation of CRC_B of the AID (as defined in ISO/IEC 7816-5) of an application in the recipient's control circuit matching the application family identifier set forth in the REQB/WUPB Command. The format for this data can indicate that the external near field communication device contains multiple near field communication applications.

The application discovery manager 316 can thus transmit multiple REQB/WUPB commands and receive multiple ATQB responses from the external near field communication device until it gets a matching application family identifier or CRC_B(AID). The application discovery manager 316, receiving the ATQB response, can set up a number of slots for collision (up to 16,) by transmitting a SLOT-MARKER command.

When an application is selected by the application discovery manager 316, and the application resides in the application discovery manager's execution environment 307, the application discovery can launch that application. Where the application resides in another execution environment, the application discovery manager 317 will transmit a forwarding message from its message forwarding module 318.

As noted above, the forwarding message can contain the forwarding level of detection, which could be levels other than the application level and the internal sub-level of the forwarded detection level, which is indicative of the level of the detection sequence. The forwarding message can also contain the last command response from an external near field communication device, a device identification number, such as the UID number or PUPI number, or other control information. In one embodiment, the forwarding message includes an element identifier corresponding to an execution environment in which the selected near field communication application resides, a status of application discovery, and a current level of application discovery.

Where the forwarding message is associated with ISO 7186 type application identifier discovery, the forwarding message can include the application level to forward (level 4), the sublevel (0, meaning that level 4 is completed with identification of the required application identifier), and the application identifier. (Note that the element identifier may be transmitted in an alternate message to the near field communication circuit controller 301 for switch configuration.)

In the case of an ISO 14443 B type discovery, the forwarding message can include the level 2 (collision detection) level to forward, the sub level 2 (meaning level 2 is completed only for identification of multiple applications and PUPI number—a Pseudo-Unique PICC Identifier (PUPI) is used to differentiate PICCs during anti collision. This 4-byte number may be either a number dynamically generated by the PICC or a diversified fixed number), the PUPI number, the total number of slots dedicated to anticollison detection, and the amount of slots have been taken already.

Now that the application discovery manager 316 is understood, one exemplary protocol discovery manager 319 selection operation will be described. Presume for the purposes of this example that execution environment 304 is a generic execution environment without a "secure" region where proprietary and other applications can be stored. Also presume that execution environment 304 contains only near field communication applications that are accessible by the protocol discovery manager 319 (i.e., those applications that are discoverable on levels other than the application level.) (Note that this is the communication structure drawn in FIG. 3 by the arrows passing through the switch 219).

Now presume that execution environment 305 contains at least one near field communication application that can be activated by the protocol discovery manager 319, and an application that can be activated by the application discovery manager 316. Execution environment 306 includes near field communication applications that can be identified, selected, and activated by the application discovery manager 316, and execution environment 307 is of course the default execution environment containing the application discovery manager 316. Execution environment 307 further contains near field communication applications that can be identified by the application discovery manager 316.

Using these presumptions for the purposes of this example, upon the request for communication from an external terminal in the card emulation mode, the protocol discovery manager 319 transmits application discovery identification information at the protocol levels. The protocol discovery manager 319, as described above, is capable of near field communication application selection based on the collision detection level. It is further capable of configuring the routing switch 219 to direct data communication between the near field communication circuit interface and the execution environment of its selected near field communication application. This type of selection can be used for applications that are be identified by UID numbers (ISO14443A), PUPI number (ISO14443B), or other proprietary ID based on applications pattern.

When the execution environment corresponding to the selected near field communication application is initialized, the following processes can occur: First, where it takes a relatively large amount of time to initialize the execution environment, the protocol discovery manager 319 can be configured to pre-enable the execution environment. Next, where the initialization time for the execution environment is relatively short, the protocol discovery manager 319 may merely send a wake-up command through the configured routing switch 219.

Turning now to a selection process by the application discovery manager 316 and the protocol discovery manager 319, during the first collision detection level, in one embodiment, the protocol discovery manager 319 receives a RATS command from an external near field communication device. This command notifies the near field communication circuit 216 that an external device is detected, and that the device is compliant with the ISO14443 standard.

The protocol discovery manager 319 then calls the default execution environment 307 to activate the protocol discovery manager 319. This initiates the application discovery manager 316 beginning the application discovery process. The protocol discovery manager therefore configures the routing switch 219 to direct data to the default execution environment 307.

To further assist with the selection process, the following optional operations may be completed: First, the default execution environment 307 can be pre-enabled prior to any near field communication transaction where default execution environment 307 enablement is relatively slow. Alternatively, the protocol discovery manager 319 can send a wake-up command through the configured routing switch 219 to the default execution environment 307 where a relatively short activation time is required.

Figure 4:
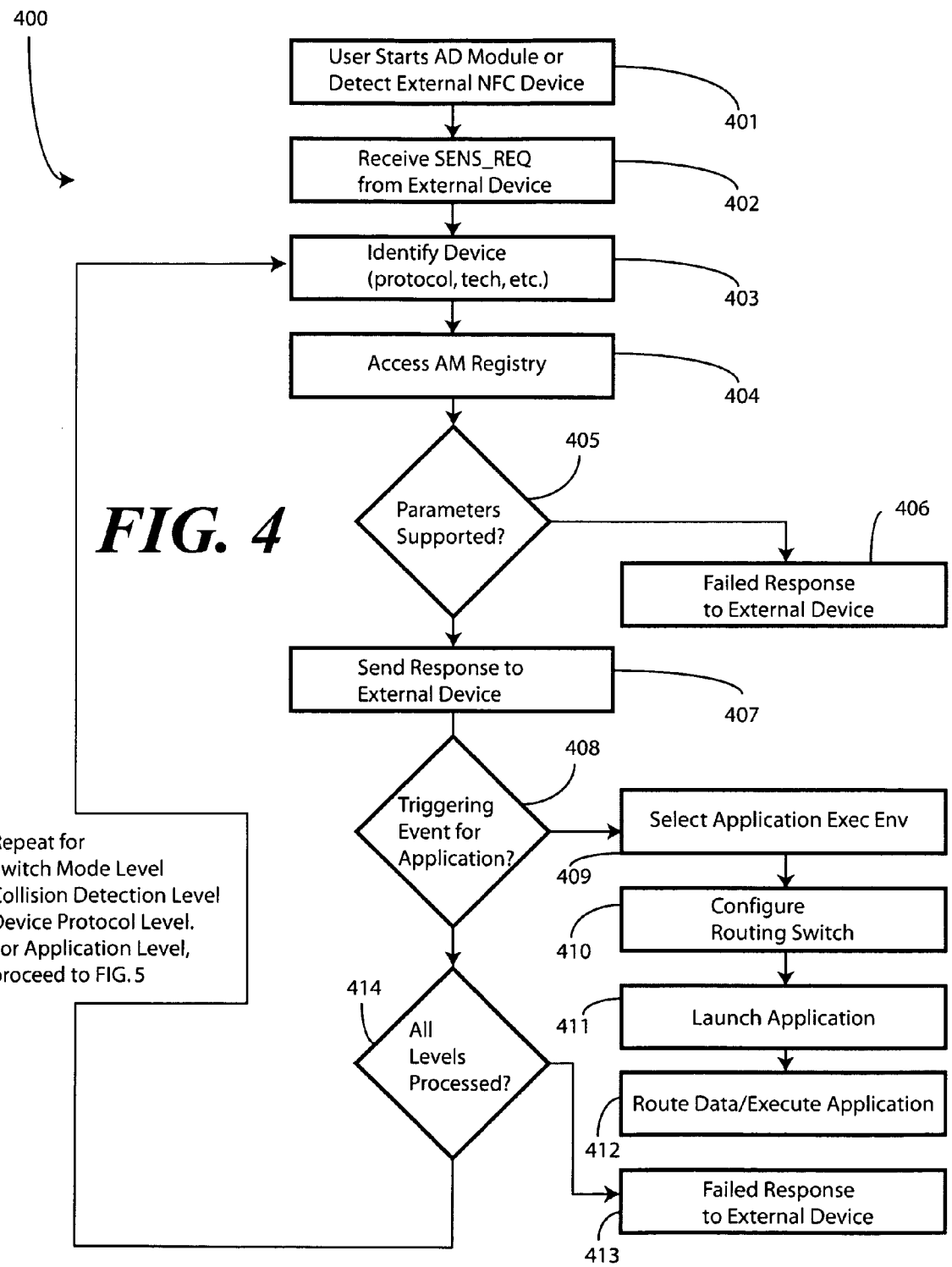
FIG. 4 illustrates one method of automatically selecting and launching a near field communication application in accordance with embodiments of the invention.

Turning now to FIG. 4, illustrated therein is one method 400 suitable for coding as executable code for the near field communication circuit controller (301) in accordance with the invention.

At step 401, the near field communication circuit (216) detects the presence of an external near field communication device. Alternatively, the user may enable the application discovery feature or the near field communication circuit proactively. This detection/activation enables the near field communication circuit (216) to begin communication with the external near field communication device.

At step 402, near field communication circuit (216) receives a SENS_REQ command from the external near field communication device. From this communication, the near field communication circuit controller (301), through its protocol discovery manager (319), identifies a near field communication technology at a protocol level, a technology level, and an anticollision level at step 403. The near field communication circuit controller (301), in one embodiment, is capable of communication with a wide variety of near field communication technologies and devices. The near field communication circuit controller (301) accomplishes this by emulating a single near field communication circuit interface when communicating with remote near field communication devices. The near field communication circuit controller (301) operating in concert with the protocol discovery manager (319) at the various levels (321,322,323) of the protocol stack, identifies the near field communication technology.

At step 404, the protocol discovery manager (319) accesses its registry to determine whether parameters of enabled applications that correspond with the near field communication technology exist. Where the parameters are supported, as determined at decision 405, the process moves to step 407. Where there are no parameters corresponding to the near field communication technology, which is indicative of the fact that no compatible near field communication applications exist, the process terminates at step 406. The termination process can include the transmission of a failure response.

At step 407, the near field communication circuit (216) transmits a response to the external near field communication device. This response can include a list of enabled applications that correspond to the near field communication technology. Alternatively, this communication can include a selected near field communication application.

At decision 408, the near field communication circuit detects a triggering event. Such a triggering event can include a confirmation message being received from the external near field communication device. For instance, where the response sent at step 407 indicated a selection of potentially compatible near field communication applications, the external near field communication device may respond with a particular selection, which would constitute a triggering event.

Where no triggering event is detected at decision 408, the identification and selection process continues at the next level. For instance, while the identification and selection process may initially have been at the switch mode level, and may repeat at the collision detection level, and so forth. Where all levels are processed and no triggering event has occurred, as detected at decision 414, the near field communication circuit (216) returns a failed response to the external device at step 413.

At step 409, where a triggering event has occurred, the near field communication circuit controller (301) selects and enables the execution environment in which the selected near field communication application resides. The selected execution environment has an application discovery manager (316) and registry table (318) stored therein.

At step 411, the near field communication circuit (216), operating in conjunction with the protocol discovery manager (319) configures the routing switch (219) for communication with the selected execution environment. At step 411, the selected near field communication application is launched. While the transaction of the selected near field communication application is processing, data is routed to the selected near field communication application and its execution environment at step 412.

Note that the step 411 of launching can be partitioned between the application discovery process and the execution environment in which the selected near field communication application resides. This partitioning can depend on the type of application, design preferences in allocation of applications throughout the execution environments, specific implementation partitioning of the near field communication application stack, and so forth. Each application in each execution environment can rely on processing of all protocol levels at the near field communication circuit controller. Application execution within each execution environment can be started, for example, after the mode switch level from the next three upper levels. As such, the mode switch level of execution may be partitioned into the application discovery mechanism (e.g., the protocol discovery manager or the application discovery manager), while the upper levels of execution may be partitioned into the execution environment.

The routing flag from the registry can be used to determine this execution partitioning. For example, where the routing flag is in a true state, which corresponds to a particular parameter of the application level selection process, this can signal the application discovery module to route data to the execution environment where the remaining partition of the execution process is allocated.

Figure 5:
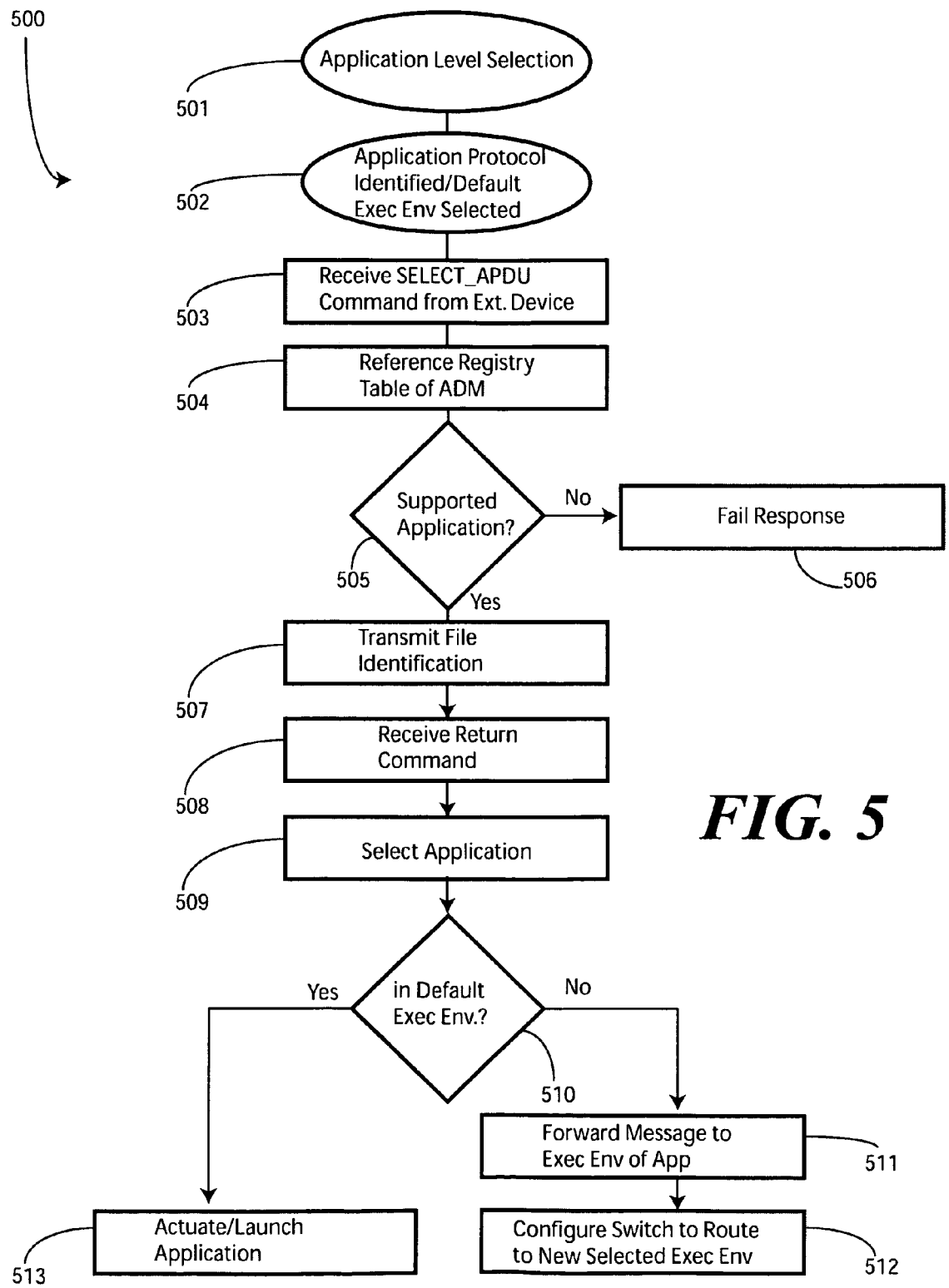
FIG. 5 illustrates one method of an application discovery manager selecting an application in accordance with embodiments of the invention.

Turning now to FIG. 5, illustrated therein is one method 500 suitable for coding as executable code for the functionality of the application discovery manager (316). The method of FIG. 5 occurs when the selection process is to happen at the application level, as indicated at 501. Further, the method 500 of FIG. 5 presumes that a required application protocol has been identified by the protocol discovery manager (319), as indicated at 502. As stated above, the protocol discovery manager (319) can identify required application as one of applications family based on family identifications (RATS command for ISO14443 type A and AFI, CID numbers for ISO14443B, for instance). In this case, the protocol discovery manager (319) has selected the default execution environment with the application discovery manager disposed therein, and configures the switch and routes data to the default execution environment with application discovery manager (316).

At step 503, the application discovery manager (316), operating in the default execution environment, receives communication from the external near field communication device. This communication can include, in one embodiment, a SELECT_APDU command.

At step 504, the application discovery manager (316) references the registry table for identification parameters corresponding to the SELECT_APDU command. Where the parameters exist, as determined at decision 505, a compatible near field communication application exists. Where the parameters do not exist, the application discovery manager (316) can transmit a fail response to the external near field communication device at step 506.

Where the compatible parameters exist, the application discovery manager (316) causes the near field communication circuit (216) to transmit file control information associated with the enabled near field communication applications through the near field communication circuit controller (301) at step 507. (Recall that the application discovery manager (316) enables certain applications, or families of applications, when the protocol discovery manager (319) detects characteristics of a received near field communication signal.) In one embodiment, the file control information comprise at least a list of application identifiers associated with the enabled near field communication applications.

At step 508, the near field communication circuit (216) receives a response command from the external near field communication device and delivers it to the default execution environment (307) and the application discovery manager (316). In one embodiment, the return command identifies a selected application identifier from the list of application identifiers corresponding to the enabled applications.

At step 509, the application discovery manager (316) determines or selects a near field communication application from the enabled near field applications. As described above, in one embodiment this selection is based upon the registry table (319). It is accessed to determine a particular near field application based upon the application identifier found in the return command of step 508. Further, an execution environment identifier indicating in which execution environment the selected near field communication application resides can also be retrieved from the registry table (319).

At decision 510, the application discovery manager (316) determines whether the selected near field communication application resides in its execution environment or another execution environment. Where the selected near field application resides in its execution environment, the application discovery manager (316) is capable of launching the near field communication application at step 513.

At step 511, the application discovery manager (316) transmits a forwarding message from its message forwarding module (318) to an application manager of the execution environment in which the selected near field application resides. In one embodiment, this message is sent from the default execution environment to another execution environment or secure element via the near field communication control circuit. The message can include a physical identifier of the other execution environment in which a particular application or applet resides. This physical identifier can be used to forward the execution of the transaction protocol to the other execution environment or secure element.

Once this message is routed, the application discovery manager 316 can configure the switch to route data to the other execution environment or secure element based upon an element identifier received in the message and corresponding identifiers in the local registry table at step 512. The application discovery manager 316 can then initialize the other execution environment or secure element to run a particular applet or application according to a procedure described above, or in accordance with a preselected application priority as might be the case where there is a large latency time of initialization. The application discovery manager (316) either directly configures the routing switch (219) or directs the near field communication circuit controller (301) to configure the routing switch (219) to route data communication between the near field communication circuit controller (301) and the execution environment in which the selected near field communication application resides. This switch configuration permits data to flow from the external near field communication device to the execution environment in which the enabled and launched near field communication application resides.

Figure 6:
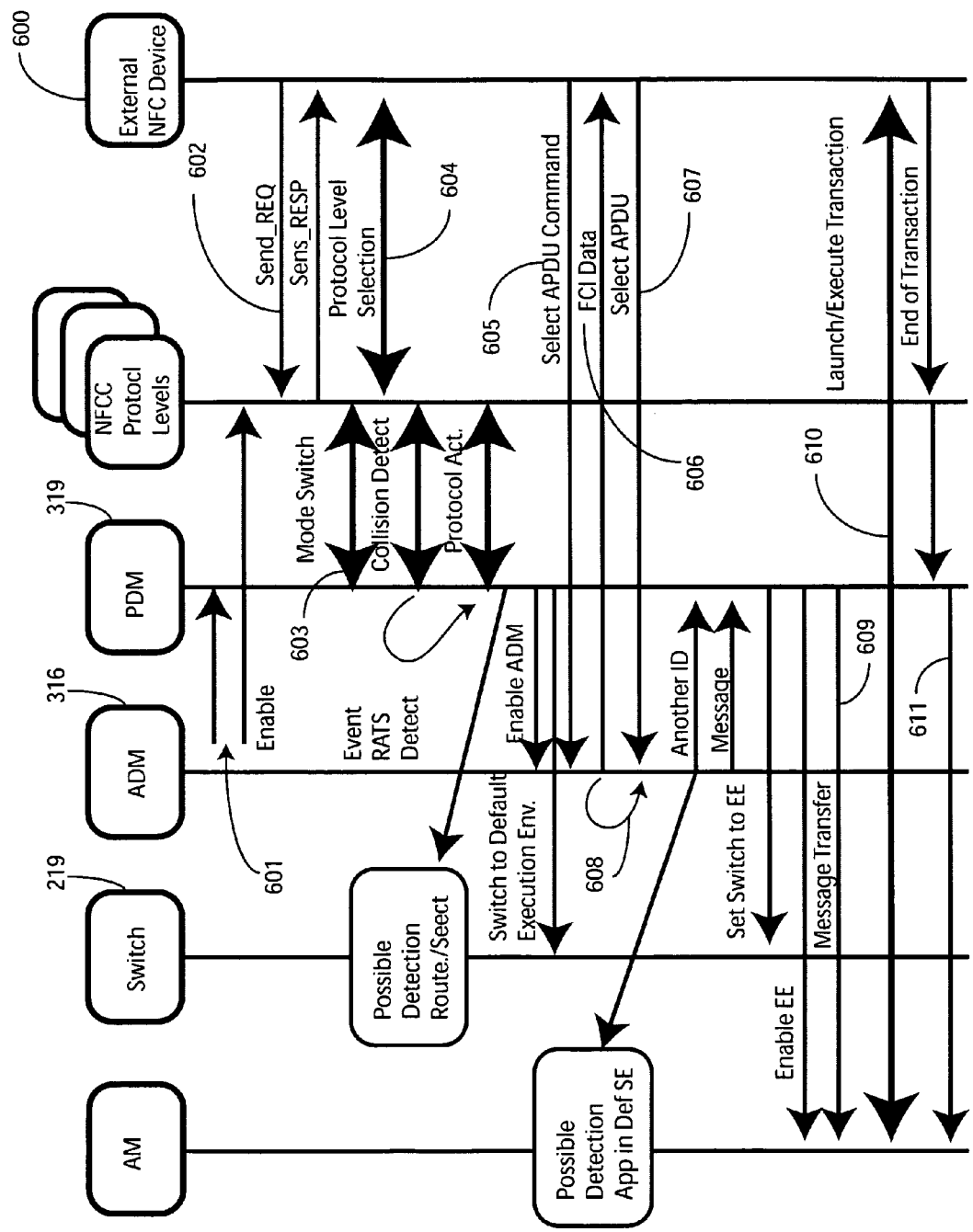
FIG. 6 illustrates a signal flow diagram of one method of automatically selecting and launching a near field communication application in accordance with embodiments of the invention.

Turning now to FIG. 6, illustrated therein is one routing flow diagram corresponding to a near field communication application selection in accordance with embodiments of the invention. FIG. 6 illustrates a signal flow diagram for one operational example. The following example describes the selection of an applet based on APDU level defined by the ISO7816 standard.

At activity 601, the near field communication circuit (216) is enabled. This can occur in a variety of ways. For instance, a user may elect to activate the near field communication circuit feature of his mobile device by selecting an icon on the user interface.

At activity 602, the near field communication circuit controller 301 establishes communication with the external near field communication device 600. In one embodiment, this is accomplished by exchanging SENS_RESP messages. At activity 603, the mode switch is initialized. Note that both the mode switch activity level (321) and the collision detection level (322) use enabled near field communication application identification parameters from the application registry (324) during the initialization. Where there is no enabled identification parameter in the application registry (324) during the processing protocol, the near field communication process terminates. Where the near field communication technology, such as type A, B, or F, is identified, the near field communication circuit controller 301 transmits a corresponding to technology command response at activity 604. Further, at the next level, which is the collision detection level (322), the near field communication circuit controller 301 responds to the external near field communication device 600 with a target identification, such as card or Peer-to-Peer target, an application identifier, such as PUPI, UID number, or family identifier for APDU or MAP based applets, and so forth.

In response to on an external near field communication device terminal SELECT_APDU command (supported by ISO7816 standard) transmitted at activity 605, an initialized default execution environment (307), and more particularly the application discovery manager 316 running in that execution environment (307), transmits file control information via the near field communication circuit controller 301 at activity 606. This file control information, in one embodiment, contains the list of application identification numbers corresponding to certain, enabled near field applications disposed in the various execution environments.

In return, the external near field communication device 600 transmits an ISO7816/Global Platform APDU command SELECT_APDU at activity 607. This command conveys an application identifier (AID) and file identifier (FID) that uniquely identifies the enabled application it wants to select. The application discovery manager 316 then transmits file control information (FCI) in response. This identifier provides information on the selected application, thereby signaling selection of the near field communication application. While the FCI response to the SELECT_APDU command contains information corresponding to the selected application, it may also convey some AID of other applications that the application discovery manager 316 is capable of managing. Upon receiving the FCI, the external near field communication device 600 can select another application based on this information. Where this is the case, it issues a new SELECT_APDU command with the AID of the alternate application. The response is again a FCI. The process can repeat—depending upon the configuration of the system.

Where the external near field communication device is unable to find an acceptable application identifier, the application discovery manager 316 will terminate the transaction. Where a near field communication application is selected, however, the application discovery manager 316 checks its registry table (317) for allocation of the application at activity 608.

Where the selected near field communication application resides in the default execution environment (307), the application discovery manager 316 launches the application. Where the selected near field communication application resides in another execution environment, however the application discovery manager 316 transmits a forwarding message at activity 609. The selected near field communication application is launched and the transaction executes at activity 610. For instance, where the transaction is a payment transaction and the selected near field communication application is a virtual credit card, a payment transaction occurs.

An end of transaction message can be sent at activity 611 when the transaction is complete. This notifies the user interface 531 that the transaction is complete and can optionally turn off the near field communication circuit (216).

To recap, at the protocol level of selection, the protocol discovery manager 319 can select the near field communication application because the upper (application) level of discovery is not required. In such a case, the protocol discovery manager 319 can further configure the routing switch 219 to route data to the proper execution environment. However, when application level discovery is required, for instance discovery based upon UID number, PUPI number, and so forth, the application discovery manager 316 performs the discovery process. The application discovery manager 316 can then launch the selected application where the application resides in the default execution environment. Where it does not, the application discovery manager 316 can transmit a message to the appropriate execution environment.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A portable electronic device, comprising:
a near field communication circuit having a near field communication circuit controller operable with the near field communication circuit;
a plurality of near field communication applications stored in one or more execution environments, each being operable with the near field communication circuit controller, wherein at least one of the plurality of near field communication applications is stored within a default execution environment; and
a protocol discovery manager, operable with the near field communication circuit controller, configured to identify a near field communication technology associated with an external near field communication device at a protocol level, a near field communication technology level, and a collision detection level, and to select the default execution environment based upon the near field communication technology;
wherein the default execution environment comprises an application discovery manager configured to select one of the plurality of near field communication applications at a level other than the protocol level the technology level, or the collision detection level.

2. The portable electronic device of claim 1, wherein the application discovery manager further comprises a message-forwarding module configured to transmit an application discovery message from the default execution environment to an other of the one or more execution environments.

3. The portable electronic device of claim 1, wherein the portable electronic device further comprises an interface switch, operable with the near field communication controller, configured to selectively route data communication between the near field communication circuit controller and the one or more execution environments.

4. The portable electronic device of claim 3, wherein the application discovery manager and the protocol discovery manager are each configured with an ability to transmit a switch configuration message to the near field communication circuit controller to direct the interface switch to route the data communication between the near field communication circuit controller and an execution environment associated with the one of the plurality of near field communication applications.

5. The portable electronic device of claim 1, wherein each of the one or more execution environments comprises an application manager configured to manage execution of near field communication applications stored therein, wherein the application discovery manager, stored within one of the one or more execution environments, comprises a message forwarding module configured to transmit an application discovery forwarding message to the application manager in at least one other of the one or more execution environments.

6. The portable electronic device of claim 5, wherein the application discovery manager further comprises registry table of the plurality of near field communication applications residing within the plurality of execution environments, the registry table comprising at least a near field communication application identifier associated with each of the plurality of near field communication applications, and at least one element identifier associated with another of the one or more execution environments.

7. The portable electronic device of claim 6, wherein the application discovery forwarding message comprises the at least one element identifier corresponding to one of the one or more execution environments.

8. The portable electronic device of claim 7, wherein the application discovery forwarding message further comprises a status of application discovery, and a current level of application discovery.

9. The portable electronic device of claim 1, wherein the one or more execution environments comprises a plurality of secure elements, wherein the default execution environment comprises one of the plurality of secure elements, further wherein near field communication applications discoverable by the application discovery manager are stored within a default secure element.

10. The portable electronic device of claim 9, wherein the protocol discovery manager is configured to activate the one of the plurality of secure elements, while the application discovery manager is configured to activate the at least another of the plurality of secure elements.

11. In a portable electronic device having near field communication capabilities and a plurality of near field communication applications stored in a plurality of execution environments, a method for automatically selecting one or more near field communication applications comprising the steps of:
    detecting an external near field communication device;
    identifying a near field communication technology at a protocol level, a technology level, and an anticollision level;
    selecting a default execution environment having an application discovery manager and a registry table stored therein based upon the near field communication application identifier;
    wherein the application discovery manager identifies a near field communication application at an application level by referencing an application identifier stored in the registry table; and
    executing the near field communication application.

12. The method of claim 11, wherein the plurality of execution environments comprise a plurality of secure elements, further comprising the step of referencing the registry table to determine a secure element in which the near field application resides.

13. The method of claim 12, further comprising the step of directing data communication through an interface switch from the default execution environment to the secure element in which the near field application resides.

14. The method of claim 13, further comprising the step of initializing the secure element in which the near field communication application resides.

15. In a default execution environment, operable with a near field communication controller, a method for selecting a near field communication application from a plurality of near field communication applications stored within one or more execution environments, the method comprising the steps of:
    transmitting file control information associated with the enabled near field communication applications through the near field communication controller, wherein the file control information comprises a list of application identifiers associated with the enabled near field communication applications;
    receiving a command identifying a selected application identifier from the list of application identifiers;
    determining the near field communication application from the selected application identifier by accessing a registry table; and
    one of actuating the near field communication application or sending an application forwarding message to a selected execution environment corresponding to the selected application identifier.

16. The method of claim 15, wherein the application forwarding message comprises at least a forwarding level of detection, wherein the forwarding level of detection is selected from the group consisting of a protocol level, an anticollision level, a transfer level, and an application level.

17. The method of claim 16, wherein the application forwarding message further comprises an indicator of a status of a layer detection sequence, a most recently received command response, and a near field communication device identifier.

18. The method of claim 15, further comprising the step of directing the near field communication circuit controller to configure a switch to route data communication between the near field communication circuit controller and the selected execution environment.

19. The method of claim 15, wherein the step of determining the near field communication application occurs at an application level.

* * * * *